United States Patent [19]
Eipper et al.

[11] Patent Number: 4,971,376
[45] Date of Patent: Nov. 20, 1990

[54] BUMPER FOR VEHICLES

[75] Inventors: Konrad Eipper, Ammerbuch; Wolfgang Fischer, Leinfelden, both of Fed. Rep. of Germany

[73] Assignee: Daimler-Benz, Fed. Rep. of Germany

[21] Appl. No.: 426,168

[22] Filed: Oct. 25, 1989

[30] Foreign Application Priority Data

Nov. 26, 1988 [DE] Fed. Rep. of Germany ....... 3839976

[51] Int. Cl.$^5$ .............................................. B60R 19/08
[52] U.S. Cl. .................................... 293/132; 293/120; 293/134
[58] Field of Search ............... 293/120 X, 134 X, 126, 293/132, 134, 135

[56] References Cited

U.S. PATENT DOCUMENTS

| | | | |
|---|---|---|---|
| 3,884,516 | 5/1975 | Gallion et al. | 293/120 |
| 4,054,312 | 10/1977 | Strader, Jr. | 293/134 |
| 4,167,282 | 9/1979 | Matsuyama | 293/120 |
| 4,460,206 | 7/1984 | Peter | 293/134 |
| 4,586,739 | 5/1986 | Loren et al. | 293/120 |
| 4,826,226 | 5/1989 | Klie et al. | 293/120 |

FOREIGN PATENT DOCUMENTS 2340245 9/1978 Fed. Rep. of Germany .
3325104 1/1985 Fed. Rep. of Germany .

Primary Examiner—Robert R. Song
Attorney, Agent, or Firm—Evenson, Wands, Edwards, Lenahan & McKeown

[57] ABSTRACT

A bumper for vehicles, with a symmetrically backswept rail, is supported on a skeleton member of the vehicle body via shock absorbing arrangement. To simplify the construction by use of so called foam systems, and at the same time ensuring a high system efficiency, the shock absorbing arrangement is formed by an impact damper extending over the rail length and made of energy absorbing (EA) foam. Arranged in the midle of the bumper is a regenerable shock absorber which works on the positive displacement principle, passes through local clearances in an impact damper and in the rail and is supported on the skeleton member and on a trim shell engaging at a distance round the rail. An impact strip made of EA foam is inserted between the trim shell and the rail.

12 Claims, 2 Drawing Sheets

FIG. I

BUMPER FOR VEHICLES

BACKGROUND AND SUMMARY OF THE INVENTION

The present invention generally relates to a bumper for vehicles, especially for passenger cars, and more particularly to a sweep back bumper configured to provide high energy absorption and efficiency in the event of a central collision at the bumper.

A bumper of this type is disclosed by German Published, Unexamined Patent Application No. 3,325,104, wherein, in the event of a central collision, only a small foam volume is subjected to stress because of the sharp backsweep of the bumper. As a result of this configuration, a low energy absorption and poor efficiency is achieved.

To overcome this disadvantage as far as possible, the carrier part of a bumper, according to German Published, Unexamined Patent Application No. 3,325,104, is made highly stable to acquire a load distribution function, thus resulting in greater weight and therefore the need for special supporting measures to prevent the bumper from sagging or drooping over.

An object of the present invention, even on sharply backswept bumpers of less weight having a carrier part which does not perform any pronounced load function, is to support a projecting middle region of the bumper in a controlled manner, in order thereby to make it possible to transmit a high level of force into a skeleton member for supporting the carrier part at a vehicle body even under only slight deformations and, at the same time increasing the efficiency of the bumper.

A regenerable shock absorber arranged, according to advantageous embodiments of the invention, in the middle of the bumper is subjected to stress even in response to only slight deformation of a trim shell of the bumper and therefore has a very high efficiency. Furthermore, by a pushing in of the positive displacement piston of the shock absorber, the sharp backsweep of the bumper is largely cancelled, and the collision energy is transmitted over a wide area into energy absorbing foam of an impact strip and impact damper. The overall system efficiency, in terms of energy reduction, is improved up to 100% in comparison with a pure foam system in backswept bumpers.

Although German Published, Unexamined Patent Application No. 2,243,065 discloses the insertion of a shock absorber, designed as a piston/cylinder unit, between a fixed vehicle part and the middle of a largely non-backswept bumper, nevertheless, in interaction with two further shock absorbers arranged outside the middle of the bumper, these shock absorbers constitute the only energy absorbing elements, and therefore because of the lack of energy absorbing foam as a preeminent energy absorber there is a different initial situation.

Advantageous embodiments of the bumper according to the invention, with expedient developments and forms of construction of the invention, emerge from the further description to follow.

If, according to a preferred exemplary embodiment of the invention, a so-called fender element is interposed between the working cylinder of the shock absorber and the skeleton member, this avoids endangering persons in vehicles which collide sideways with a vehicle equipped with the bumper according to the invention. This safety measure is achieved, since the shock absorber, after retracting, under further increasing stress bends downwards and consequently comes out of the zone putting persons in danger. By a suitable design of the fender element, the latter, by experiencing deformation, can absorb further collision energy.

Other objects, advantages and novel features of the present invention will become apparent from the following detailed description of the invention when considered in conjunction with the accompanying drawings.

DETAILED DESCRIPTION OF THE DRAWINGS

Figure 1:
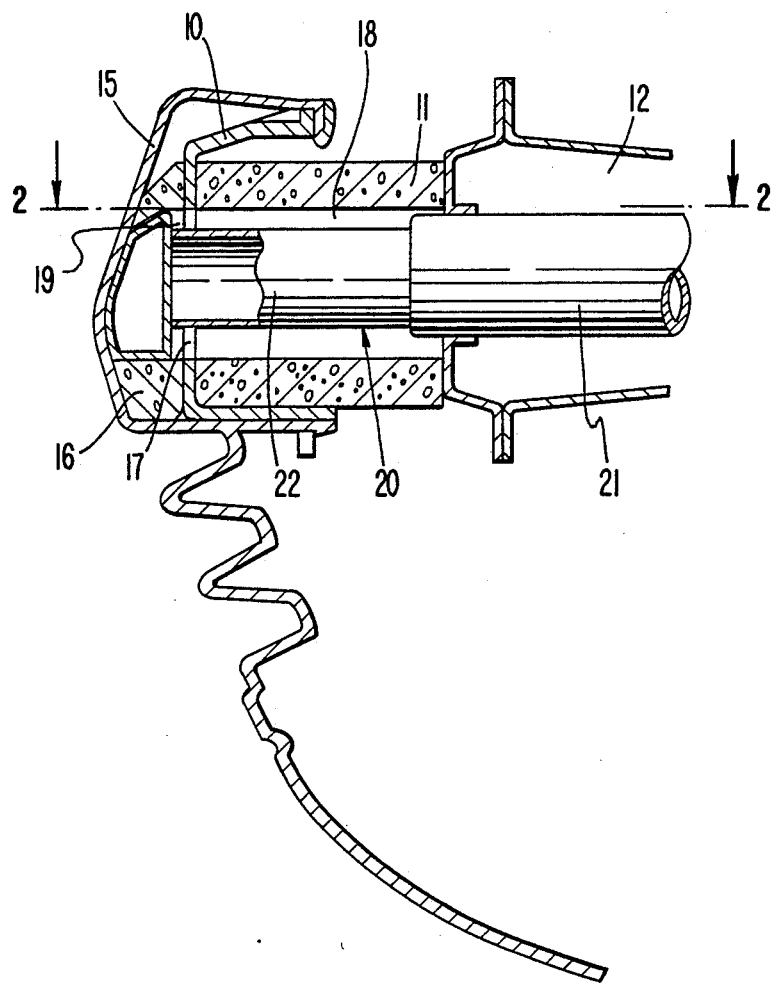
FIG. 1 shows a cross-section through a bumper according to one embodiment of the present invention.

The invention is described in detail below by means of the exemplary embodiments illustrated in the drawings.

Figure 2:
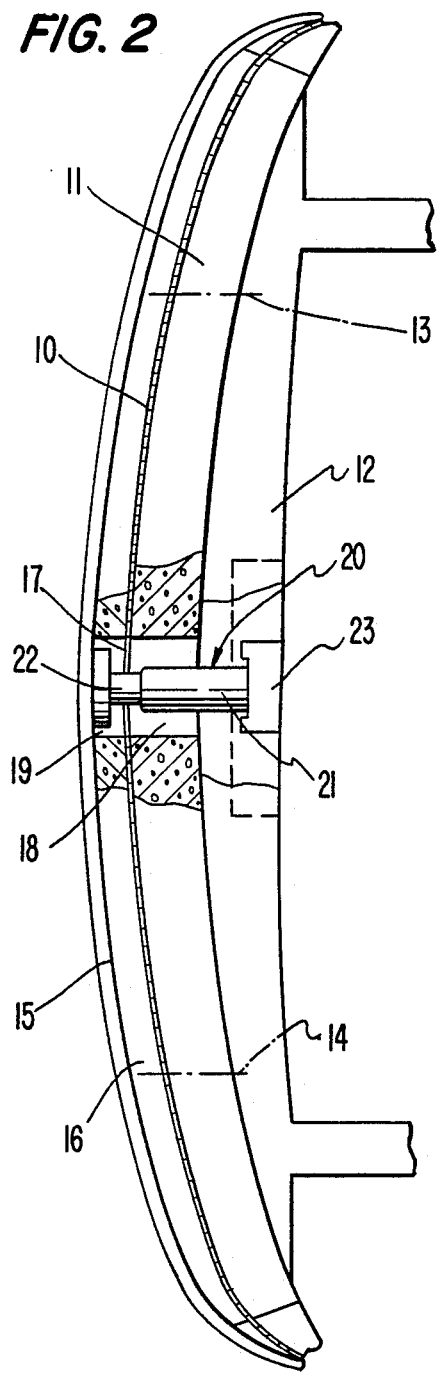
FIG. 2 shows a section through the bumper along the line II—II of FIG. 1, FIGS. 3 and 4 each show a side view of a fender element according to a further embodiment of the present invention before (FIG. 3) and after (FIG. 4) the exertion of excessive impact stress.

A bumper shown in cross-section in FIG. 1 and in longitudinal section in FIG. 2 and intended for a vehicle, especially a passenger car, has a carrier part 10 in the form of an approximately U-shaped rail which is designed, for example, as a thin walled plastic part. The rail 10 extends, for example, over the entire width of the vehicle and is symmetrically swept back to a large extent, so that it projects furthest forwards in the middle of the bumper and is set back towards both sides.

The rail 10 is supported, for example, over an entire length thereof on a skeleton member 12 of the vehicle body via an impact damper 11 made of energy absorbing foam, so called EA foam. The rail 10 is fastened to the skeleton member 12 by retention elements 13, 14 which are represented by dot-and-dash lines in FIG. 2.

A plastic trim shell 15 engages at a distance over the rail 10 along the entire length of the latter. An impact strip 16 likewise made of EA foam is inserted in a cavity present between the trim shell 15 and the rail 10, so that the trim shell 15 is supported over its entire length on the rail 10 by the impact strip 16.

In the middle of the bumper, the rail 10, impact damper 11 and impact strip 16 have local clearances 17, 18, 19, respectively. A hydraulic shock absorber 20, which is fastened to the skeleton member 12 and which rests against the trim shell 15, passes through the local clearances 17, 18, 19. The shock absorber 20 includes, in a known way, a working cylinder 21 and a positive displacement piston 22 shiftable in the latter and at the same time displacing hydraulic oil.

The working cylinder 21 is retained on the skeleton member 12 via a fender element 23 (FIGS. 3 and 4), while the positive displacement piston 22 rests against an inner wall of the trim shell 15. Instead of a hydraulic shock absorber 20, it is also possible to use a so-called solid shock absorber which works on the same principle as hydraulic shock absorber 20, but which has a solid, for example silicone, as a positive displacement medium.

Figure 3:
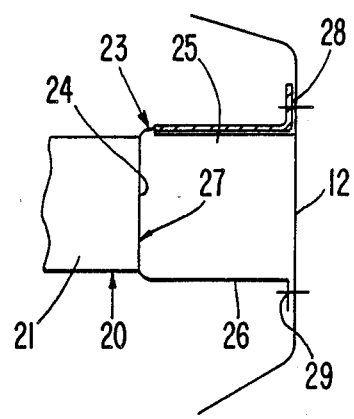
Figure 4:
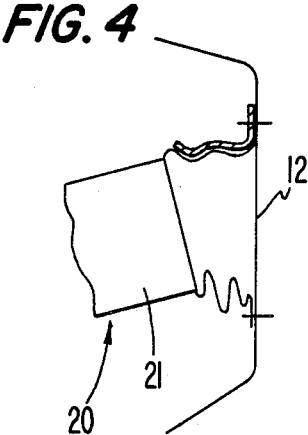

The fender element 23 shown in FIGS. 3 and 4, according to a further embodiment of the present invention, is designed in such a way that it bends downwards when the hydraulic shock absorber 20 is subjected to excessive stress, as illustrated in FIG. 4. The fender element 23 is formed, for example, by a U-shaped supporting Yoke 24 which has two legs 25 and 26 and a web 27 connecting the legs to one another. The leg 25 which is the upper in the installation position has a larger material thickness or material strength than the lower leg, thereby ensuring a controlled downward bending under excessive stress. The working cylinder 21 is fastened to the web 27 of the supporting yoke 24. The leg ends are angled to form fastening tabs 28, 29 which are connected firmly to the skeleton member 12.

In the event of a frontal collision against the above-described bumper, the hydraulic shock absorber 20 in the region of the bumper projecting furthest forwards is subjected to stress even in response to only a slight deformation of the trim shell 15. The positive displacement piston 22 is pushed into the working cylinder 21, with the consumption of energy. As is known, the hydraulic shock absorber 20 has a very high efficiency. As a result of the backward movement of the positive displacement piston 22, the sharp backsweep of the bumper is cancelled, and further collision energy is transmitted over a wide area into the impact strip 16 and the impact damper 11. Virtually the entire foam volume is consequently available for energy absorption. A large amount of energy is therefore absorbed and a very high system efficiency achieved.

When the shock absorber is subjected to overstress in a collision, the fender element 23 bonds downwards, as shown in FIG. 4, and the front region of the bumper shifts downwards. This avoids endangering persons in another vehicle, should the bumper strike against the side of the other vehicle. By a suitable design, the fender element 23 can also additionally be used as an energy absorber, for example if, by experiencing deformation, it consumes collision energy at the same time as it bends.

In another exemplary embodiment not shown, the carrier part 10 is formed not by the special rail, but because the impact damper 11 and the impact strip 16, which both extend over the entire length of the bumper and which consist of energy absorbing foam, are foam-filled, the carrier part 10 is formed directly into the trim shell 15. Furthermore, in that case, the retention elements 13 and 14 are likewise also foam-filled directly. There is therefore no need for a special independent element, for example in the form of the rail 10, in this exemplary embodiment.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Bumper for a vehicle, comprising a symmetrically backswept carrier supported on a skeleton member of a vehicle body via an impact damper, an impact strip covered by a trim shell being provided in advance of the carrier in the driving direction, and both the impact damper and the impact strip being formed from an energy absorbing foam, and a regenerable, positive displacement shock absorber with a working cylinder and a positive displacement piston provided at a middle region of the bumper, wherein he regenerable, positive displacement shock absorber passes through local clearances int he carrier, the impact damper and the impact strip and is supported ont he trim shell by the positive displacement piston and on the skeleton member by the working cylinder.

2. Bumper according to claim 1, wherein a fender element fastens the regenerable shock absorber to the skeleton member and is operatively arranged such that the shock absorber, when subjected to overstress, bends one of downwards and upwards in a controlled manner.

3. Bumper according to claim 2, wherein the fender element is a U-shaped supporting yoke with legs and two fastening tabs projecting away from legs of the yoke, an upper leg of the legs of the yoke is in an upper position of an installation position of the yoke and has a larger material strength than a lower leg of the legs of the yoke, and the working cylinder is fastened to a web connecting the legs of the yoke to one another and belongs to the supporting yoke, with the web being fastened to the skeleton member.

4. Bumper according to claim 3, wherein the upper leg has a greater material thickness than the lower leg.

5. Bumper according to claim 1, wherein the regenerable shock absorber is one of a hydraulic shock absorber and a solid shock absorber.

6. Bumper according to claim 1, wherein the trim shell is made of plastic.

7. Bumper according to claim 1, wherein the carrier part is formed from a rail.

8. Bumper according to claim 6, wherein the rail is a thin walled plastic part.

9. Bumper according to claim 1, wherein the carrier part is formed from the impact damper and the impact strip.

10. Bumper according to claim 9, wherein the impact damper and impact strip are foam-filled directly with the trim shell.

11. Bumper according to claim 1, wherein the symmetrically backswept carrier part extends over an entire width of the vehicle.

12. Bumper according to claim 1, wherein both the impact damper and the impact strip extend over an entire length of the carrier part.

* * * * *